United States Patent
Yoshida et al.

(10) Patent No.: US 7,755,879 B2
(45) Date of Patent: Jul. 13, 2010

(54) NON-AQUEOUS ELECTROLYTIC SOLUTION FOR ELECTRIC DOUBLE LAYER CAPACITOR AND ELECTRIC DOUBLE LAYER CAPACITOR USING THE SAME

(75) Inventors: Naoki Yoshida, Chiyoda-ku (JP); Katsuji Ikeda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/369,243

(22) Filed: Feb. 11, 2009

(65) Prior Publication Data

US 2009/0154063 A1  Jun. 18, 2009

Related U.S. Application Data

(63) Continuation of application No. PCT/JP2007/065008, filed on Jul. 31, 2007.

(30) Foreign Application Priority Data

Aug. 11, 2006 (JP) .............................. 2006-219711

(51) Int. Cl.
*H01G 9/00* (2006.01)
*H01G 9/02* (2006.01)

(52) U.S. Cl. ...................... 361/502; 361/503; 252/62.2

(58) Field of Classification Search ......... 361/502–503; 252/62.2
See application file for complete search history.

(56) References Cited

U.S. PATENT DOCUMENTS

| 4,725,927 | A | 2/1988 | Morimoto et al. |
| 6,879,482 | B2 | 4/2005 | Kawasato et al. |
| 7,173,807 | B2 | 2/2007 | Kawasato et al. |
| 2003/0202316 | A1 | 10/2003 | Kawasato et al. |
| 2006/0035785 | A1 | 2/2006 | Tanaka |
| 2006/0124890 | A1 | 6/2006 | Sunahara et al. |

FOREIGN PATENT DOCUMENTS

| JP | 49-068254 | 7/1974 |
| JP | 62-237715 | 10/1987 |
| JP | 03-203311 | 9/1991 |
| JP | 04-154106 | 5/1992 |
| JP | 04-286108 | 10/1992 |
| JP | 2004-6803 | 1/2004 |
| JP | 2004-1755660 | 6/2004 |
| JP | 2006-049447 | 2/2006 |
| WO | 2005-008700 | 1/2005 |

*Primary Examiner*—Eric Thomas
(74) *Attorney, Agent, or Firm*—Oblon, Spivak, McClelland, Maier & Neustadt, L.L.P.

(57) ABSTRACT

To provide a non-aqueous electrolytic solution for an electric double layer capacitor excellent in low-temperature characteristics, which solution has from 15 to 40 mass % of an electrolyte, more than 30 mass % and at most 45 mass % of a fluorobenzene represented by the following formula 1, and from 15 to 55 mass % of a cyclic carbonate represented by the formula 2:

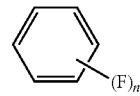

Formula 1

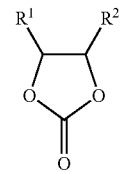

Formula 2 in the formula 1, n is an integer of from 1 to 6, and in the formula 2, each of $R^1$ and $R^2$ which are independent of each other, is a hydrogen atom or a methyl group.

15 Claims, No Drawings

NON-AQUEOUS ELECTROLYTIC SOLUTION FOR ELECTRIC DOUBLE LAYER CAPACITOR AND ELECTRIC DOUBLE LAYER CAPACITOR USING THE SAME

TECHNICAL FIELD

The present invention relates to a non-aqueous electrolytic solution for an electric double layer capacitor, and an electric double layer capacitor.

BACKGROUND ART

As a known shape of an electric double layer capacitor, there may, for example, be a coin type wherein is an element having a separator sandwiched between a pair of polarized electrodes composed mainly of activated carbon formed on current collectors, is accommodated together with an electrolytic solution in a metal casing, which is then sealed by a metal cover via a gasket, or a cylindrical type wherein an element having a pair of polarized sheet electrodes wound with a separator interposed therebetween, is accommodated together with an electrolytic solution in a metal casing, which is then sealed so that the electrolytic solution will not evaporate from an opening of the casing.

Further, as one for a large current and large capacitance application, a stacking type electric double layer capacitor has also been known wherein an element having many polarized sheet electrodes stacked via a separator disposed therebetween, is incorporated (Patent Documents 1 to 3). In such a stacking type electric double layer capacitor, rectangular polarized sheet electrodes are used as positive electrodes and negative electrodes, and they are alternately stacked with a separator interposed therebetween, to form an element, which is then accommodated in a casing in such a state that positive electrode lead members and negative electrode lead members are connected by caulking to the ends of the positive and negative electrodes, respectively, then the element is impregnated with an electrolytic solution, and the casing is sealed with a cover.

As an electrolytic solution for an electric double layer capacitor, not only an aqueous electrolytic solution containing e.g. a mineral acid such as sulfuric acid, an alkali metal salt or an alkali, but also various non-aqueous electrolytic solutions (organic electrolytic solutions) have been used. The non-aqueous electrolytic solution has a withstanding voltage of from 2.5 to 3.3 V, while the aqueous electrolytic solution has a withstanding voltage of 0.8 V. The electrostatic energy of a capacitor is proportional to the square of the withstanding voltage. Accordingly, from the viewpoint of the electrostatic energy, the non-aqueous electrolytic solution is more advantageous.

A solvent to be used for the non-aqueous electrolytic solution is necessary to highly dissolve an electrolyte, and therefore a solvent having high dielectric constant is preferred. Specifically, propylene carbonate, γ-butyrolactone, acetonitrile, dimethylformamide (Patent Document 4), sulfolane or its derivative (Patent Document 5) or fluorobenzene (Patent Document 6) has been known.

However, such a solvent having a high dielectric constant usually has a high viscosity, and therefore there was a problem that it was impossible to obtain high electric conductivity.

On the other hand, a chain ether, a chain ester, a chain carbonate and the like, which are low viscosity solvents, have a low dielectric constant, whereby substantially no electrolyte will be dissolved therein, and therefore there was a problem that no high electric conductivity was obtained.

Propylene carbonate which is commonly used as a solvent for a non-aqueous electrolytic solution, is a solvent having a high dielectric constant and a relatively not so high viscosity at room temperature, and is thereby preferably used.

However, a non-aqueous electrolytic solution in which propylene carbonate is used as a solvent and a salt comprising as a cation $(C_2H_5)_4N^+$, $(C_2H_5)_4P^+$, $(C_2H_5)_3(CH_3)N^+$ or the like having a high electric conductivity is used as an electrolyte, has a relatively good electric conductivity at around room temperature, but the electric conductivity remarkably decreases at low temperature, and therefore there was a problem that an electric double layer capacitor using such a non-aqueous electrolytic solution was poor in low temperature characteristics.

On the other hand, Patent Document 7 discloses a non-aqueous electrolytic solution for an electric double layer capacitor, characterized by containing, as an electrolyte, spiro quaternary ammonium tetrafluoroborate in a mixed solvent containing dimethyl carbonate and propylene carbonate, for the purposes of low viscosity and excellent low temperature characteristics.

Further, in Patent Document 8, the present inventors have proposed an electrolytic solution comprising as an electrolyte, a pyrrolidinium cation represented by $R^aR^bR^cR^dN^+$ (wherein each of $R^a$ and $R^b$ which are independent of each other, is a $C_{1-4}$ alkyl group, and $R^c$ and $R^d$ together form a tetramethylene group to provide a cyclic pyrrolidinium cation), and as solvents, dimethyl carbonate, sulfolane and fluorobenzene.

In such an electrolytic solution, the above electrolyte having the pyrrolidinium cation is highly soluble in dimethyl carbonate as a solvent having a low dielectric constant and a low viscosity, sulfolane is added thereto as a solvent to improve the uniformity of the solution in a region of low electrolyte concentration, and further fluorobenzene which has a low melting point of −42° C. and which is a low viscosity solvent is added thereto as a solvent, whereby it is possible to realize an electric double layer capacitor having a low resistance and running also in low temperature region.

Patent Document 1: JP-A-4-154106 (Claims, FIG. 1)
Patent Document 2: JP-A-3-203311 (Claims, FIG. 3)
Patent Document 3: JP-A-4-286108 (claim 1)
Patent Document 4: JP-A-49-068254 (Claims)
Patent Document 5: JP-A-62-237715 (Claims)
Patent Document 6: JP-A-2004-6803 (Claims)
Patent Document 7: JP-2006-49447 (Claims)
Patent Document 8: WO05/008700 (Claims)

DISCLOSURE OF THE INVENTION

Object to be Accomplished by the Invention

However, the present inventors have conducted extensive studies and as a result, found that each of electrolytic solutions disclosed in Patent Documents 7 and 8 is not yet sufficient in low temperature characteristics to obtain a recent electric double layer capacitor which is required to be excellent in low temperature characteristics.

Accordingly, it is an object of the present invention to provide a non-aqueous electrolytic solution for an electric double layer capacitor excellent in low temperature characteristics and such an electric double layer capacitor, more specifically, an electric double layer capacitor having excellent charge and discharge characteristics (especially output characteristics) at room temperature and low temperature and a non-aqueous electrolytic solution excellent in the electric conductivity at low temperature to be used for the capacitor.

Means to Accomplish the Object

The present inventors have conducted extensive studies to achieve the above object and as a result, found that by incorporating an electrolyte, a specific fluorobenzene and a specific cyclic carbonate in specific proportions, particularly by incorporating the specific fluorobenzene in an amount much more than ever, the low temperature characteristics of an electrolytic solution become excellent. The present invention has been accomplished on the basis of these discoveries.

Namely, the present invention provides the following (1) to (7).

(1) A non-aqueous electrolytic solution for an electric double layer capacitor, comprising from 15 to 40 mass % of an electrolyte, more than 30 mass % and at most 45 mass % of a fluorobenzene represented by the following formula 1, and from 15 to 55 mass % of a cyclic carbonate represented by the following formula 2:

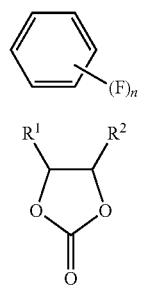

Formula 1

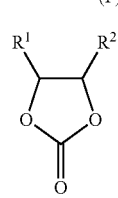

Formula 2 in the formula 1, n is an integer of from 1 to 6, and in the formula 2, each of $R^1$ and $R^2$ which are independent of each other, is a hydrogen atom or a methyl group.

(2) The non-aqueous electrolytic solution for an electric double layer capacitor according to the above (1), which further contains from 3 to 30 mass % of a third organic solvent other than the above fluorobenzene and the above cyclic carbonate.

(3) The non-aqueous electrolytic solution for an electric double layer capacitor according to the above (2), wherein the above third organic solvent is at least one member selected from the group consisting of sulfolane, dimethyl carbonate, diethyl carbonate and ethyl methyl carbonate.

(4) The non-aqueous electrolytic solution for an electric double layer capacitor according to any one of the above (1) to (3), wherein the above electrolyte has at least one cation selected from the group consisting of a quaternary onium cation represented by the following formula 3, an imidazolium cation represented by the following formula 4 and a quaternary onium cation represented by the following formula 5:

$$R^3R^4R^5R^6N^+$$

Formula 3

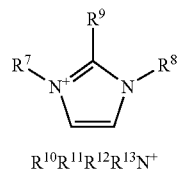

Formula 4

$$R^{10}R^{11}R^{12}R^{13}N^+$$

Formula 5 in the formula 3, each of $R^3$, $R^4$, $R^5$ and $R^6$ which are independent of one another, is a methyl group, an ethyl group or an n-propyl group, provided that two selected from $R^3$ to $R^6$ may be bonded with each other to form a tetramethylene group; in the formula 4, each of $R^7$ and $R^8$ which are independent of each other, is a $C_{1-3}$ alkyl group or a methoxyalkyl group represented by the formula —$(CH_2)_mOCH_3$ (wherein m is an integer of from 1 to 3) and $R^9$ is a hydrogen atom or a methyl group; and in the formula 5, $R^{10}$ is a methoxyalkyl group represented by the formula —$(CH_2)_nOCH_3$ (wherein n is an integer of from 1 to 3); and each of $R^{11}$, $R^{12}$ and $R^{13}$ which are independent of one another, is a methyl group or an ethyl group, provided that two selected from $R^{11}$ to $R^{13}$ may be bonded with each other to form a tetramethylene group.

(5) The non-aqueous electrolytic solution for an electric double layer capacitor according to any one of the above (1) to (3), wherein the above electrolyte is at least one member selected from the group consisting of an electrolyte represented by the following formula 6, an electrolyte represented by the following formula 7 and an electrolyte represented by the following formula 8, the above fluorobenzene is monofluorobenzene, and the above cyclic carbonate is propylene carbonate:

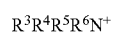

Formula 6

Formula 7

Formula 8

(6) The non-aqueous electrolytic solution for an electric double layer capacitor according to the above (4), which further contains from 3 to 30 mass % of a third organic solvent other than the above fluorobenzene and the above is cyclic carbonate.

(7) The non-aqueous electrolytic solution for an electric double layer capacitor according to the above (5), which further contains from 3 to 30 mass % of a third organic solvent other than the above fluorobenzene and the above cyclic carbonate.

(8) The non-aqueous electrolytic solution for an electric double layer capacitor according to the above (6), wherein the above third organic solvent is at least one member selected from the group consisting of sulfolane, dimethyl carbonate, diethyl carbonate and ethyl methyl carbonate.

(9) The non-aqueous electrolytic solution for an electric double layer capacitor according to the above (7), wherein the above third organic solvent is at least one member selected from the group consisting of sulfolane, dimethyl carbonate, diethyl carbonate and ethyl methyl carbonate.

(10) An electric double layer capacitor having a pair of polarized electrodes and an electrolytic solution capable of forming an electric double layer at the interface with the polarized electrodes, wherein the above electrolytic solution is the non-aqueous electrolytic solution for an electric double layer capacitor as defined in the above (1).

(11) The electric double layer capacitor according to the above (10), wherein the above pair of polarized electrodes contains, as a constituent, a carbon material having a pore volume of from 0.9 to 1.6 mL/g, obtained by a nitrogen absorption method.

EFFECTS OF THE INVENTION

The non-aqueous electrolytic solution for an electric double layer capacitor of the present invention and the electric double layer capacitor of the present invention are excellent in low temperature characteristics.

BEST MODE FOR CARRYING OUT THE INVENTION

Now, the present invention will be described in detail. First of all, the non-aqueous electrolytic solution for an electric double layer capacitor of the present invention (hereinafter referred to simply as "the electrolytic solution of the present invention") will be described.

The electrolytic solution of the present invention is a non-aqueous electrolytic solution comprising from 15 to 40 mass % of an electrolyte, more than 30 mass % and at most 45 mass % of fluorobenzene represented by the following formula 1, and from 15 to 55 mass % of cyclic carbonate represented by the following formula 2:

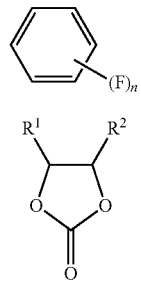

Formula 1

Formula 2

In the formula 1, n is an integer of from 1 to 6, and in the formula 2, each of $R^1$ and $R^2$ which are independent of each other, is a hydrogen atom or a methyl group.

The fluorobenzene to be used in the present invention is not particularly Limited so long as it is one represented by the above formula 1, but is preferably one having a high dielectric constant, and particularly preferably at least one member selected from the group consisting of monofluorobenzene, difluorobenzene and trifluorobenzene. As a structure of difluorobenzene, o-difluorobenzene or m-difluorobenzene is preferred. As a structure of trifluorobenzene, 1,2,3-trifluorobenzene or 1,2,4-trifluorobenzene is preferred.

They may be used alone, or two or more of them may be used in combination.

The content of the fluorobenzene in the electrolytic solution of the present invention is more than 30 mass % and at most 45 mass %, preferably more than 33 mass % and at most 42 mass %, based on the total amount of the electrolytic solution.

When the content of the fluorobenzene is more than 30 mass %, the electric conductivity of the electrolytic solution at low temperature, particularly at low temperature of at most −30° C. becomes excellent.

On the other hand, if the electrolytic solution contains the fluorobenzene, the dielectric constant of the entire electrolytic solution (organic mixed solvent) is lowered, whereby the ion conductivity is decreased, and its influence will be remarkable especially at a temperature around room temperature or higher. When the content of the fluorobenzene is at most 45 mass %, such a problem is less likely to arise.

The functional principle in the present invention is not clearly understood, but the fluorobenzene is a solvent having a melting point of −42° C. and having a low viscosity even at low temperature, and it has a somewhat higher dielectric constant than e.g. chain carbonate, and therefore it is considered that by incorporating the fluorobenzene into an electrolytic solution in a range of the above-mentioned specific amount, the reduction of the viscosity of the electrolytic solution at low temperature and the securement of a dissociation state of ions are accelerated, and high ionic conductivity is maintained.

Patent Document 6 discloses a non-aqueous electrolytic solution containing a fluorobenzene ([Claim 1]), wherein the fluorobenzene is contained in an amount of preferably from 0.1 to 30%, particularly preferably from 1 to 20%, based on the total mass of the electrolytic solution ([0016]), and discloses that it is possible to use such a fluorobenzene and e.g. propylene carbonate in combination, as solvents ([0026]).

However, such a non-aqueous electrolytic solution is not intended to improve the low-temperature characteristics, and further it is poor in the low-temperature characteristics since the content of the fluorobenzene is too low.

Whereas, in the electrolytic solution of the present invention, the content of the fluorobenzene is very large at a level of more than 30 mass % and at most 45 mass %, and further the cyclic carbonate is used as an essential component, whereby the fluorobenzene has an ability to lower the viscosity of the electrolytic solution at low temperature, and further the cyclic carbonate having a high dielectric constant compensates the degradation of the dielectric constant at a temperature around room temperature or higher due to the large amount of the fluorobenzene incorporated therein, whereby excellent electric conductivity is shown at room temperature and low temperature.

The cyclic carbonate to be used in the present invention is one represented by the above formula 2, and may, particularly, be ethylene carbonate, propylene carbonate or butylene carbonate. Especially, propylene carbonate is preferred from the viewpoint that it is possible to form a uniform solution in a wide range.

They may be used alone or in combination as a mixture of two or more of them.

The content of the cyclic carbonate in the electrolytic solution of the present invention is from 15 to 55 mass %, preferably from 30 to 45 mass %, based on the total amount of the electrolytic solution. When the content is within the above range, at a temperature of from low temperature to around room temperature or higher, it is possible to secure sufficient solubility of the electrolyte in the solvent and high electric conductivity of the electrolytic solution.

In the present invention, since a cyclic carbonate having a high dielectric constant is used, the solubility of the electrolyte is high.

If a chain carbonate is used instead of the cyclic carbonate, the dielectric constant of the chain carbonate is lower than the cyclic carbonate, and therefore the solubility of the electrolyte will be deteriorated. In such a case, if an ionic liquid such as 1-ethyl-3-methylimidazolium borofluoride (EMIBF$_4$, an electrolyte represented by the formula 8 as mentioned below) is used as the electrolyte, phase separation tends to occur. Further, if ethylmethylpyrrolidinium borofluoride (EMPyBF$_4$, an electrolyte represented by the formula 6 as mentioned below) or methylpropylpyrrolidinium borofluoride (EMPPyBF$_4$, an electrolyte represented by the formula 7 as mentioned below) is used as the electrolyte, a uniform solution may be obtained in an extremely narrow concentration range, but if the concentration is higher or lower than the range, it is impossible to obtain a uniform solution. This is more remarkable at low temperature.

Thus, if a chain carbonate is used instead of the cyclic carbonate, it is difficult to obtain a uniform solution since the solubility of the electrolyte will be deteriorated, and even if a uniform solution is obtained, the electric conductivity will be lowered especially at a low temperature since the solubility of the electrolyte is low (see Example 11 (Comparative Example) in Examples as given below).

Patent Document 8 discloses an electrolytic solution containing dimethyl carbonate, sulfolane and fluorobenzene as solvents.

However, since dimethyl carbonate as a chain carbonate is used in such an electrolytic solution and further sulfolane (melting point: 28° C.) having a higher melting point than dimethyl carbonate (melting point: about 4° C.) is incorporated as an essential component, its electric conductivity at low temperature is low as compared with the electrolytic solution of the present invention in which a cyclic carbonate is used, and such an electrolytic solution has no adequate low temperature characteristics to satisfy recent requirement for excellent output characteristics at lower temperature.

In one of the preferred embodiments, the electrolytic solution of the present invention contains, as a solvent, from 3 to 30 mass % of a third organic solvent other than the above fluorobenzene and the above cyclic carbonate. By incorporating the third organic solvent therein in the above range, it is possible to lower the temperature dependency of the electric conductivity.

The third organic solvents may be used alone or two or more of them may be used in combination.

The third organic solvent is preferably at least one member selected from the group consisting of sulfolane, dimethyl carbonate, diethyl carbonate and ethylmethyl carbonate. Among them, as the third organic solvent, dimethyl carbonate is preferred from the viewpoint that it is possible to increase the electric conductivity at a low temperature while maintaining high electric conductivity at room temperature. This is considered attributable to the fact that the increase of the viscosity at a low temperature is suppressed by using dimethyl carbonate.

The electrolyte to be used in the present invention is not particularly limited, and it is possible to use e.g. a conventional electrolyte which is used for a non-aqueous electrolytic solution for an electric double layer capacitor, but from the viewpoint of the electric conductivity, the solubility and the electrochemical stability, it is preferred that the electrolyte has at least one cation selected from the group consisting of a quaternary onium cation represented by the following formula 3, an imidazolium cation represented by the following formula 4 and a quaternary onium cation represented by the following formula 5:

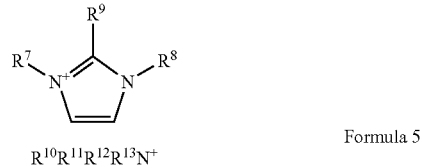

In the formula 3, each of $R^3$, $R^4$, $R^5$ and $R^6$ which are independent of one another, is a methyl group, an ethyl group or an n-propyl group, provided that two selected from $R^3$ to $R^6$ may be bonded with each other to form a tetramethylene group; in the formula 4, each of $R^7$ and $R^8$ which are independent of each other, is a $C_{1-3}$ alkyl group and $R^9$ is a hydrogen atom or a methyl group; and in the formula 5, $R^{10}$ is a methoxyalkyl group represented by the formula: —(CH$_2$)$_n$OCH$_3$ (wherein n is an integer of from 1 to 3) and each of $R^{11}$, $R^{12}$ and $R^{13}$ which are independent of one another, is a methyl group or an ethyl group, provided that two selected from $R^{11}$ to $R^{13}$ may be bonded with each other to form a tetramethylene group.

Further, the electrolyte to be used in the present invention preferably has at least one anion selected from the group consisting of $BF_4^-$, $PF_6^-$, $CF_3SO_3^-$ and $(CF_3SO_2)_2N^-$. Among them, from the viewpoint of the electric conductivity and the electrochemical stability, $BF_4^-$ is preferred.

One of the preferred embodiments of the electrolyte is specifically at least one member selected from the group consisting of an electrolyte represented by the following formula 6, an electrolyte represented by the following formula 7 and an electrolyte represented by the following formula 8;

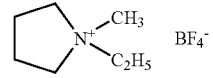

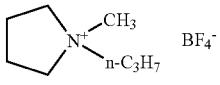

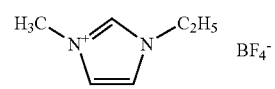

The content of the electrolyte in the electrolytic solution of the present invention is from 15 to 40 mass %, preferably from 18 to 30 mass %, based on the total amount of the electrolytic solution. When such a content is within the above range, the mass molar concentration of the electrolyte can readily be made in such preferred ranges as mentioned below.

The mass molar concentration of the electrolyte in the electrolytic solution of the present invention is preferably at least 0.8 mol/kg, more preferably at least 1.0 mol/kg for the purpose of securing the amount of ions required to form an electric double layer and obtaining the sufficient electric conductivity.

Further, if the mass molar concentration of the electrolyte is too high, the viscosity of the electrolytic solution is increased, whereby the electric conductivity tends to be lowered. Especially, its influence is remarkable at low temperature, and therefore the mass molar concentration of the electrolyte is preferably at most 2.0 mol/kg.

In the electrolytic solution of the present invention, the combination of the above-mentioned electrolyte, fluorobenzene and cyclic carbonate is not particularly limited, and it is possible to employ various combinations.

Among them, as one of preferred embodiments, the electrolyte is at least one member selected from the group consisting of the electrolyte represented by the above formula 6, the electrolyte represented by the above formula 7 and the electrolyte represented by the above formula 8, the fluorobenzene is monofluorobenzene, and the cyclic carbonate is propylene carbonate.

The lower the contents of metal impurities and moisture are, the better the electrolytic solution of the present invention becomes. Usually, the content of the moisture is preferably at most 30 ppm.

The electrolytic solution of the present invention contains the electrolyte, the specific fluorobenzene and the specific cyclic carbonate in the specific proportions as mentioned above, whereby the electrolytic solution has extremely excellent low temperature characteristics.

Now, the electric double layer capacitor of the present invention will be described.

The electric double layer capacitor of the present invention is an electric double layer capacitor having a pair of polarized electrodes and an electrolytic solution capable of forming an electric double layer at the interface with the polarized electrodes, wherein the above electrolytic solution is the nonaqueous electrolytic solution for an electric double layer capacitor of the present invention.

The pair of polarized electrodes to be used in the present invention is preferably one made mainly of an electrochemically inert material having a high specific surface area. For example, it is possible to use polarized electrodes to be used for a conventional electric double layer capacitor.

It is preferred that the polarized electrodes mainly have a carbon material and an electrically conductive substance. Among them, more preferred are polarized electrodes having an electrode layer comprising a carbon material powder and an electrically conductive substance, formed on the surface of metal current collectors.

The carbon material to be used is preferably one having a high specific surface area. As the carbon material having a high specific surface area, activated carbon or polyacene may, for example, be suitably mentioned.

The activated carbon is not particularly limited, and may, for example, be one derived from a natural plant tissue such as coconut shell; a synthetic resin such as phenol; or a fossil fuel such as coal, coke or pitch.

The activated carbon is preferably one subjected to activation treatment. As an activating method for activated carbon, steam activation or alkali activation (for example, activation by KOH) may usually be applied, although it may vary depending upon the raw material of the activated carbon. Activated carbon derived from a natural plant tissue or a fossil fuel, contains a relatively large amount of metal impurities, and accordingly, washing with e.g. an acid is usually required. Activated carbon obtained by alkali activation contains a large amount of an alkali metal used for the activation or metal impurities brought from an activation apparatus due to the reaction with the alkali, and accordingly a washing operation is required similarly.

In the present invention, activated carbon made of a synthetic resin as a raw material, which is subjected to activation treatment by steam activation (steam activated carbon), is preferred from the viewpoint that the content of metal impurities is low.

It is preferred that a carbon material having a high specific surface area is porous, and has a pore volume measured by nitrogen adsorption method of from 0.9 to 1.6 mL/g. In the case of a large current charging and discharging at low temperature, when the pore volume is at least 0.9 mL/g, the internal resistance of the cell will be small, and therefore it is possible to obtain excellent performance. When the pore volume is at most 1.6 mL/g, the bulk density moderately increases, whereby the capacitance per volume of the polarized electrode is sufficiently secured, and therefore it is possible to obtain excellent performance.

Accordingly, in the electric double layer capacitor of the present invention, as one of the preferred embodiments, a pair of polarized electrodes contains a carbon material having a pore volume of from 0.9 to 1.6 mL/g as a constituent.

The electrically conductive substance is not particularly limited, but may, for example, be carbon black, acetylene black, ketchen black, carbon whisker, metal fine particles or fine electrically conductive oxide particles.

As one of the preferred embodiments, the electrode layer is formed in such a manner that the above-mentioned electrically conductive substance and a binder such as polytetrafluoroethylene (PTFE), polyvinylidene fluoride (PVdF) or carboxymethyl cellulose, are added to the above-mentioned carbon material, the mixture is kneaded in the presence of a liquid lubricant such as alcohol, then the kneaded product is formed into a sheet by rolling, followed by drying to obtain a sheet-form molded product, which is then bonded by heat pressing or by means of an electrically conductive adhesive or the like to both sides of a metal current collector.

Further, as another one of the preferred embodiments, the electrode layer is formed in such a manner that the above-mentioned electrically conductive substance and the above binder are added to the above-mentioned carbon material, and further a solvent capable of dissolving the above binder or a solvent mixture (for example, a solvent mixture of e.g. water and N-methylpyrrolidone) containing such a solvent is mixed thereto to obtain a slurry, which may be then applied on both surfaces of a metal current collector, followed by drying.

The thickness of such an electrode layer is not particularly limited, but is usually from about 10 µm to 0.5 mm.

The element construction of the electric double layer capacitor of the present invention is not particularly limited, and it is possible to apply a coin type structure, a cylindrical structure or a rectangular structure thereto.

The coin type structure may, for example, be formed in such a manner that an element is formed by disposing a separator between a pair of polarized electrodes, and the above element is accommodated in a coin type metal casing together with the electrolytic solution of the present invention, followed by sealing by a metal cover and a gasket which insulates both.

The cylindrical structure may, for example, be is formed in such a manner that a pair of belt-like polarized electrodes, namely a belt-like positive electrode having an electrode layer formed on both surfaces of a metal current collector and a belt-like negative electrode having an electrode layer formed on both surfaces of the metal current collector, are alternatively stacked via a belt-like separator and wound to obtain a wound element, which is then accommodated in a cylindrical metal casing and impregnated with the electrolytic solution of the present invention, whereupon current collecting leads taken out from the positive electrode and the negative electrode, respectively, are connected, respectively, to the electrode terminals provided, for example, on an electrically insulating sealing cover, and the sealing cover with it is assembled to the metal casing.

The rectangular structure may, for example, be formed in such a manner that electrode layers are formed on both surfaces of a rectangular metal current collector, a plurality of positive electrodes and a plurality of negative electrodes, each provided with a current collecting lead, are alternatively stacked via a separator, to form a stacked element having current collecting leads taken out, which is accommodated in a rectangular metal casing and impregnated with the electrolytic solution of the present invention, whereupon a sealing cover is fit on the rectangular casing.

The metal current collector is not particularly limited so long as it is electrochemically and further chemically corrosion resistant.

In the case of a coin type structure, the housing member such as the metal sealing cover or the metal casing, may serve as a current collector, in many cases.

In the case of the cylindrical structure or the rectangular structure, it is suitable to use a surface-roughened foil or net made of a metal such as aluminum, stainless steel, nickel or tantalum. Among them, a foil or net made of a stainless steel, aluminum or an alloy is preferred. More preferred is an aluminum foil having a purity of at least 99.9 mass %, particularly preferably at least 99.99 mass %.

In the present invention, the metal current collector is preferably one made of a metal foil having a thickness of from 10 μm to 0.5 mm.

As mentioned above, in the case of a cylindrical structure or a rectangular structure, current collecting leads will be provided to the metal current collectors. Specifically, it is preferred to provide a tape- or ribbon-shaped portion on a metal current collector having no electrode layer formed thereon and to bond an electrically conductive tub terminal, wire, tape, ribbon or the like by e.g. welding to such a portion to form a current collecting lead.

Otherwise, a portion having no electrode layer formed, is provided on a part of a metal current collector, so that such a portion may be used as a current collecting lead. When this will be described with reference to the case of a cylindrical structure, on one end in the width direction of a belt-like metal current collector, a stripe portion having no electrode layer extending in the longitudinal direction formed thereon is provided, and a pair of the polarized electrodes is overlapped via a separator so that the stripe portion is located at the opposite end, and the assembly is wound to obtain an element, whereby both end surfaces (the above stripe portions) of the element can be used as current collecting leads.

The separator is not particularly limited, so long as it is a porous separator so that ions can permeate therethrough, and for example, a fine porous polyethylene film, a fine porous polypropylene film, a polyethylene non-woven fabric, a polypropylene non-woven fabric, a glass fiber incorporated non-woven fabric, a glass mat filter, a cellulose paper, a sisal hemp or a manila hemp may suitably be mentioned.

The thickness of the separator is preferably from 20 to 200 μm, more preferably from 30 to 100 μm.

From the viewpoint of the absorbability for the electrolytic solution, the liquid retaining property and the internal resistance, the higher the porosity, the better. However, as the porosity is high, defects such as pinholes are likely to increase, thus leading to self-discharge failure. Accordingly, the porosity is usually preferably from 50 to 90%, more preferably from 60 to 85%.

Since the electric double layer capacitor of the present invention employs the electrolytic solution of the present invention, its low temperature characteristics are excellent.

EXAMPLES

Now, the present invention will be described in detail with reference to Examples. However, it should be understood that the present invention is by no means restricted thereto.

1. Preparation of Electrolytic Solution

Example 1

Example of the Present Invention

In a mixed solvent comprising propylene carbonate and monofluorobenzene in a mass ratio of 60:40, $(C_2H_5)_3(CH_3)NBF_4$ (triethylmethylammonium borofluoride, $TEMABF_4$) was dissolved so as to have a concentration of 1.0 mol/kg, whereby an electrolytic solution was prepared.

Example 2

Example of the Present Invention

In a mixed solvent comprising propylene carbonate and monofluorobenzene in a mass ratio of 60:40, the electrolyte (1-ethyl-3-methylimidazolium borofluoride, $EMIBF_4$) represented by the above formula 8 was dissolved so as to have a concentration of 0.8 mol/kg, whereby an electrolytic solution was prepared.

Example 3

Example of the Present Invention

In a mixed solvent comprising propylene carbonate and monofluorobenzene in a mass ratio of 50:50, the electrolyte (1-ethyl-3-methylimidazolium borofluoride, $EMIBF_4$) represented by the above formula 8 was dissolved so as to have a concentration of 1.2 mol/kg, whereby an electrolytic solution was prepared.

Example 4

Example of the Present Invention

In a mixed solvent comprising propylene carbonate and monofluorobenzene in a mass ratio of 50:50, the electrolyte (1-ethyl-3-methylimidazolium borofluoride, $EMIBF_4$) represented by the above formula 8 was dissolved so as to have a concentration of 2.0 mol/kg, whereby an electrolytic solution was prepared.

Example 5

Example of the Present Invention

In a mixed solvent comprising propylene carbonate and monofluorobenzene in a mass ratio of 40:60, the electrolyte (methylpropylpyrrolidinium borofluoride, $MPPyBF_4$) represented by the above formula 7 was dissolved so as to have a concentration of 1.2 mol/kg, whereby an electrolytic solution was prepared.

Example 6

Example of the Present Invention

In a mixed solvent comprising propylene carbonate and monofluorobenzene in a mass ratio of 50:50, the electrolyte (ethylmethylpyrrolidinium borofluoride, EMPyBF$_4$) represented by the above formula 6 was dissolved so as to have a concentration of 1.5 mol/kg, whereby an electrolytic solution was prepared.

Example 7

Example of the Present Invention

In a mixed solvent comprising propylene carbonate, ethylene carbonate and monofluorobenzene in a mass ratio of 25:25:50, the electrolyte (1-ethyl-3-methylimidazolium borofluoride, EMIBF$_4$) represented by the above formula 8 was dissolved so as to have a concentration of 1.5 mol/kg, whereby an electrolytic solution was prepared.

Example 8

Example of the Present Invention

In a mixed solvent comprising propylene carbonate, dimethyl carbonate and monofluorobenzene in a mass ratio of 50:10:40, the electrolyte (1-ethyl-2,3-dimethylimidazolium borofluoride, EDMIBF$_4$) represented by the following formula 9 was dissolved so as to have a concentration of 1.0 mol/kg, whereby an electrolytic solution was prepared.

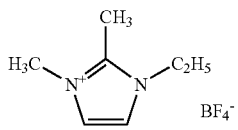

Formula 9

Example 9

Comparative Example

In a mixed solvent comprising propylene carbonate and monofluorobenzene in a mass ratio of 95:5, (C$_2$H$_5$)$_3$(CH$_3$)NBF$_4$ (triethylmethylammonium borofluoride, TEMABF$_4$) was dissolved so as to have a concentration of 1.5 mol/kg, whereby an electrolytic solution was prepared.

Example 10

Comparative Example

In a mixed solvent comprising propylene carbonate and monofluorobenzene in a mass ratio of 80:20, the electrolyte (1-ethyl-3-methylimidazolium borofluoride, EMIBF$_4$) represented by the above formula 8 was dissolved so as to have a concentration of 2.5 mol/kg, whereby an electrolytic solution was prepared.

Example 11

Comparative Example

In a mixed solvent comprising dimethyl carbonate and monofluorobenzene in a mass ratio of 50:50, the electrolyte (methylpropylpyrrolidinium borofluoride, MPPyBF$_4$) represented by the above formula 7 was dissolved so as to have a concentration of 1.8 mol/kg, whereby an electrolytic solution was prepared.

2. Evaluation of Electrolytic Solution

With respect to electrolytic solutions in Examples 1 to 11, the composition as shown by mol %, the electric conductivities at 25° C. and −30° C. and the ratio of the electric conductivity at −30° C. to the electric conductivity at 25° C. (retention of electric conductivity), are shown in Table 1.

TABLE 1

| | Components of electrolytic solution | Composition (mass %) | Electric conductivity (mS/cm) 25° C. | Electric conductivity (mS/cm) −30° C. | Retention of electric conductivity |
|---|---|---|---|---|---|
| Ex. 1 | TEMABF$_4$ | 20.5 | 14.0 | 4.0 | 29 |
| | Propylene carbonate | 47.7 | | | |
| | Monofluorobenzene | 31.8 | | | |
| Ex. 2 | EMIBF$_4$ | 15.8 | 13.3 | 3.8 | 29 |
| | Propylene carbonate | 50.5 | | | |
| | Monofluorobenzene | 33.7 | | | |
| Ex. 3 | EMIBF$_4$ | 23.8 | 16.3 | 4.2 | 26 |
| | Propylene carbonate | 38.1 | | | |
| | Monofluorobenzene | 38.1 | | | |
| Ex. 4 | EMIBF$_4$ | 39.6 | 20.7 | 3.9 | 19 |
| | Propylene carbonate | 30.2 | | | |
| | Monofluorobenzene | 30.2 | | | |
| Ex. 5 | MPPyBF$_4$ | 25.8 | 15.5 | 3.6 | 23 |
| | Propylene carbonate | 29.7 | | | |
| | Monofluorobenzene | 44.5 | | | |
| Ex. 6 | EMPyBF$_4$ | 30.2 | 17.4 | 4.1 | 24 |
| | Propylene carbonate | 34.9 | | | |
| | Monofluorobenzene | 34.9 | | | |
| Ex. 7 | EMIBF$_4$ | 29.7 | 20.7 | 5.1 | 25 |
| | Propylene carbonate | 17.6 | | | |
| | Ethylene carbonate | 17.6 | | | |
| | Monofluorobenzene | 35.2 | | | |
| Ex. 8 | EDMIBF$_4$ | 21.2 | 16.9 | 3.8 | 22 |
| | Propylene carbonate | 39.4 | | | |
| | Dimethyl carbonate | 7.9 | | | |
| | Monofluorobenzene | 31.5 | | | |
| Ex. 9 | TEMABF$_4$ | 30.4 | 16.0 | 2.3 | 14 |
| | Propylene carbonate | 66.1 | | | |
| | Monofluorobenzene | 3.5 | | | |

TABLE 1-continued

| Components of electrolytic solution | Composition (mass %) | Electric conductivity (mS/cm) 25° C. | Electric conductivity (mS/cm) −30° C. | Retention of electric conductivity |
|---|---|---|---|---|
| Ex. 10 EMIBF$_4$ | 49.5 | 20.9 | 2.6 | 12 |
| Propylene carbonate | 40.4 | | | |
| Monofluoro-benzene | 10.1 | | | |
| Ex. 11 MPPyBF$_4$ | 38.8 | 13.8 | 3.2 | 23 |
| Dimethyl carbonate | 30.6 | | | |
| Monofluoro-benzene | 30.6 | | | |

3. Preparation of Electric Double Layer Capacitor (No. 1)

Example 12

Example of the Present Invention

Ethanol was added to a mixture comprising a phenol resin type activated carbon having a specific surface area of 2,000 m$^2$/g and pore volume of 0.9 mL/g activated by steam, PTFE and carbon black in a mass ratio of 8:1:1, followed by kneading. This was formed into a sheet shape and then rolled in a thickness of 0.2 mm to obtain an electrode sheet.

The electrode sheet obtained was bonded to one side of aluminum foil with a thickness of 40 μm via a conductive adhesive. The portion having the electrode sheet bonded thereto was made to be an area of 2 cm square, and the portion of only the aluminum foil which was not bonded to the electrode sheet was cut into a shape as a lead portion at the time of connecting to an external circuit, thereby to obtain an electrode provided with a lead for tests.

Such a lead-provided electrode obtained was subjected to heat treatment under reduced pressure to remove e.g. moisture. Then, a pair of the lead-provided electrodes are faced each other via a separator (thickness: 160 μm, porosity: 70%) of a non-woven fabric made of polypropylene fiber, and fixed by sandwiching them with glass-made interposing plates from both sides to form an element.

Such an element was impregnated with the electrolytic solution prepared in Example 1, and then the element was put in an aluminum laminate container so that only the lead portions are disposed outside thereof, followed by sealing to obtain an electric double layer capacitor for tests.

Example 13

Example of the Present Invention

A lead-provided electrode for tests was obtained in the same manner as in Example 12 except that a coconut shell type activated carbon having a specific surface area of 2,300 m$^2$/g and a pore volume of 1.38 mL/g activated by steam, was used instead of the phenol resin type activated carbon.

An electric double layer capacitor for tests was obtained in the same manner as in Example 12 except that such a lead-provided electrode and the electrolytic solution prepared in Example 3 were used.

Example 14

Example of the Present Invention

An electric double layer capacitor for tests was obtained in the same manner as in Example 13 except that the electrolytic solution prepared in Example 5 was used.

Example 15

Example of the Present Invention

An electric double layer capacitor for tests was obtained in the same manner as in Example 13 except that the electrolytic solution prepared in Example 6 was used.

Example 16

Example of the Present Invention

A lead-provided electrode for a test was obtained in the same manner as in Example 12 except that a coconut shell-type activated carbon having a specific surface area of 2,200 m$^2$/g and a pore volume of 1.15 mL/g activated by steam, was used instead of the phenol resin type activated carbon.

An electric double layer capacitor for tests was obtained in the same manner as in Example 12 except that such a lead-provided electrode and the electrolytic solution prepared in Example 7 were used.

Example 17

Example of the Present Invention

An electric double layer capacitor for a test was obtained in the same manner as in Example 16 except that the electrolytic solution prepared in Example 8 was used.

Example 18

Comparative Example

An electric double layer capacitor for tests was obtained in the same manner as in Example 12 except that the electrolytic solution prepared in Example 9 was used.

Example 19

Comparative Example

An electric double layer capacitor for a test was obtained in the same manner as in Example 13 except that the electrolytic solution prepared in Example 10 was used.

4. Evaluation of Electric Double Layer Capacitor (No. 1)

The capacitance and the internal resistance of the electric double layer capacitor in each of Examples 12 to 19 were measured by a constant-current discharge method (discharge current density: 25 mA/cm$^2$) at 25° C. and −30° C., and the ratio of the capacitance at −30° C. to the capacitance at 25° C.

(capacitance retention) and the ratio of the internal resistance at −30° C. to the internal resistance at 25° C. (the internal resistance increase) were calculated. The results are shown in Table 2.

TABLE 2

|  | Capacitance retention (%) | Internal resistance increase (times) |
|---|---|---|
| Ex. 12 | 84 | 4.9 |
| Ex. 13 | 92 | 4.5 |
| Ex. 14 | 84 | 4.8 |
| Ex. 15 | 89 | 4.3 |
| Ex. 16 | 97 | 4.1 |
| Ex. 17 | 85 | 4.9 |
| Ex. 18 | 73 | 6.2 |
| Ex. 19 | 76 | 6.7 |

5. Preparation of Electric Double Layer Capacitor (No. 2)

Example 20

Example of the Present Invention

In a mixed solvent comprising propylene carbonate and monofluorobenzene in a mass ratio of 50:50, the electrolyte (1-ethyl-3-methylimidazolium borofluoride, $EMIBF_4$) represented by the above formula 8 was dissolved so as to have a concentration of 1.3 mol/kg, whereby an electrolytic solution (composition of the electrolytic solution: $EMIBF_4$ 25.7 mass %, propylene carbonate 37.1 mass %, monofluorobenzene 37.1 mass %) was prepared.

An electric double layer capacitor for tests was obtained in the same manner as in Example 16 except that such an electrolytic solution was used.

Example 21

Example of the Present Invention

An electrolytic solution was obtained in the same manner as in Example 20.

An electric double layer capacitor for tests was obtained in the same manner as in Example 13 except that such an electrolytic solution was used.

Example 22

Example of the Present Invention

An electrolytic solution was obtained in the same manner as in Example 20.

A lead-provided electrode for tests was obtained in the same manner as in Example 12 except that a coconut shell type activated carbon having a specific surface area of 1,800 m²/g and a pore volume of 0.85 mL/g activated by steam, was used instead of the phenol resin type activated carbon.

An electric double layer capacitor for tests was obtained in the same manner as in Example 12 except that such a lead-provided electrode and such an electrolytic solution were used.

6. Evaluation of Electric Double Layer Capacitor (No. 2)

The internal resistance of the electric double layer capacitor in each of Examples 20 to 22 at the time of large current pulse discharge (discharge current density: 125 mA/cm², pulse width 50 ms) was measured at 30° C. and −30° C., and the ratio of the internal resistance at −30° C. to the internal resistance at 30° C. (the internal resistance increase) was calculated. The results are shown in Table 3.

TABLE 3

|  | Internal resistance (Ω) | | Internal resistance increase |
|---|---|---|---|
|  | 30° C. | −30° C. | (times) |
| Ex. 20 | 0.62 | 1.6 | 2.6 |
| Ex. 21 | 0.60 | 1.5 | 2.5 |
| Ex. 22 | 0.71 | 2.3 | 3.3 |

As shown in Table 1, in the case of the electrolytic solutions of the present invention (Examples 1 to 8), the electric conductivity at low temperature is high, and the ratio of an electric conductivity at low temperature to the electric conductivity at room temperature (electric conductivity retention) is high.

On the other hand, in either of a case where the amount of the fluorobenzene is too low and further the amount of the cyclic carbonate is too high (Example 9) and a case where the amount of the fluorobenzene is too low and further the amount of the electrolyte is too high (Example 10), the electric conductivity at low temperature is low and the electric conductivity retention is low. Further, in a case where dimethyl carbonate as a chain carbonate is used instead of a cyclic carbonate (Example 11), the electric conductivity at low temperature is low.

Further, as shown in Table 2, in the electric double layer capacitors of the present invention (Examples 12 to 17), the ratio of the capacitance at low temperature to the capacitance at room temperature (capacitance retention) is large, the ratio of the internal resistance at low temperature (the internal resistance increase) to the internal resistance at room temperature is small, and the low temperature characteristics are excellent.

Further, as shown in Table 3, in the electric double layer capacitor of the present invention, in each of cases where an activated carbon having a specific pore volume was used for an electrode (Examples 20 and 21), the ratio of the internal resistance at low temperature to the internal resistance at room temperature at the time of the large current pulse discharge (the internal resistance increase) is low as compared with a case where such an activated carbon is not used (Example 22), and therefore the large current pulse discharge characteristics at low temperature are excellent.

INDUSTRIAL APPLICABILITY

The electrolytic solution of the present invention has low resistance and high withstand voltage, and is especially excellent in low temperature characteristics. Therefore, according to the present invention, it is possible to provide an electric double layer capacitor having low resistance, high withstand voltage and excellent low temperature characteristics.

The entire disclosure of Japanese Patent Application No. 2006-219711 filed on Aug. 11, 2006 including specification, claims, drawings and summary is incorporated herein by reference in its entirety.

What is claimed is:

1. A non-aqueous electrolytic solution for an electric double layer capacitor, comprising from 15 to 40 mass % of an electrolyte, more than 31.5 mass % and at most 45 mass % of a fluorobenzene represented by the following formula 1, and from 15 to 55 mass % of a cyclic carbonate represented by the following formula 2:

Formula 1

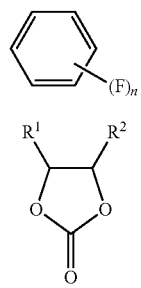

Formula 2

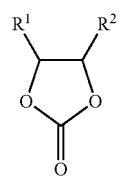

in the formula 1, n is an integer of from 1 to 6, and in the formula 2, each of R1 and R2 which are independent of each other, is a hydrogen atom or a methyl group.

2. The non-aqueous electrolytic solution for an electric double layer capacitor according to claim 1, which further contains from 3 to 30 mass % of a third organic solvent other than the above fluorobenzene and the above cyclic carbonate.

3. The non-aqueous electrolytic solution for an electric double layer capacitor according to claim 2, wherein the above third organic solvent is at least one member selected from the group consisting of sulfolane, dimethyl carbonate, diethyl carbonate and ethyl methyl carbonate.

4. The non-aqueous electrolytic solution for an electric double layer capacitor according to claim 1, wherein the above electrolyte has at least one cation selected from the group consisting of a quaternary onium cation represented by the following formula 3, an imidazolium cation represented by the following formula 4 and a quaternary onium cation represented by the following formula 5:

Formula 3

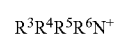

Formula 4

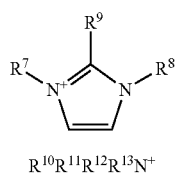

Formula 5

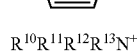

in the formula 3, each of $R^3$, $R^4$, $R^5$ and $R^6$ which are independent of one another, is a methyl group, an ethyl group or an n-propyl group, provided that two selected from $R^3$ to $R^6$ may be bonded with each other to form a tetramethylene group; in the formula 4, each of $R^7$ and $R^8$ which are independent of each other, is a $C_{1-3}$ alkyl group or a methoxyalkyl group represented by the formula —$(CH_2)_m OCH_3$ (wherein m is an integer of from 1 to 3) and $R^9$ is a hydrogen atom or a methyl group; and in the formula 5, $R^{10}$ is a methoxyalkyl group represented by the formula —$(CH_2)_n OCH_3$ (wherein n is an integer of from 1 to 3); and each of $R^{11}$, $R^{12}$ and $R^{13}$ which are independent of one another, is a methyl group or an ethyl group, provided that two selected from $R^{11}$ to $R^{13}$ may be bonded with each other to form a tetramethylene group.

5. The non-aqueous electrolytic solution for an electric double layer capacitor according to claim 4, which further contains from 3 to 30 mass % of a third organic solvent other than the above fluorobenzene and the above cyclic carbonate.

6. The non-aqueous electrolytic solution for an electric double layer capacitor according to claim 5, wherein the above third organic solvent is at least one member selected from the group consisting of sulfolane, dimethyl carbonate, diethyl carbonate and ethyl methyl carbonate.

7. The non-aqueous electrolytic solution for an electric double layer capacitor according to claim 1, wherein the above electrolyte is at least one member selected from the group consisting of an electrolyte represented by the following formula 6, an electrolyte represented by the following formula 7 and an electrolyte represented by the following formula 8, the above fluorobenzene is a monofluorobenzene, and the above cyclic carbonate is a propylene carbonate:

Formula 6

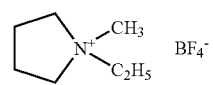

Formula 7

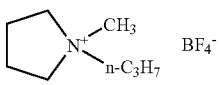

Formula 8

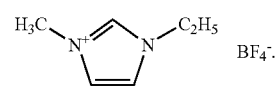

8. The non-aqueous electrolytic solution for an electric double layer capacitor according to claim 7, which further contains from 3 to 30 mass % of a third organic solvent other than the above fluorobenzene and the above cyclic carbonate.

9. The non-aqueous electrolytic solution for an electric double layer capacitor according to claim 8, wherein the above third organic solvent is at least one member selected from the group consisting of sulfolane, dimethyl carbonate, diethyl carbonate and ethyl methyl carbonate.

10. An electric double layer capacitor having a pair of polarized electrodes and an electrolytic solution capable of forming an electric double layer at the interface with the polarized electrodes, wherein the above electrolytic solution is the non-aqueous electrolytic solution for an electric double layer capacitor as defined in claim 1.

11. The electric double layer capacitor according to claim 10, wherein the above pair of polarized electrodes contains, as a constituent, a carbon material having a pore volume of from 0.9 to 1.6 mL/g, obtained by a nitrogen absorption method.

12. The non-aqueous electrolytic solution for an electric double layer capacitor according to claim 1, wherein the cyclic carbonate comprises propylene carbonate; and the electrolyte is selected from the group consisting of triethylmethylammonium borofluoride, 1-ethyl-3-methylimidazolium borofluoride, methylpropylpyrrolidinium borofluoride, ethylmethylpyrrolidinium borofluoride, and 1-ethyl-2,3-dimethylimidazolium borofluoride; and the fluorobenzene is monofluorobenzene.

13. The non-aqueous electrolytic solution for an electric double layer capacitor according to claim 12, wherein the fluorobenzene is present in an amount of more than 33 mass %.

14. The non-aqueous electrolytic solution for an electric double layer capacitor according to claim 1, wherein the fluorobenzene is present in an amount of more than 33 mass %.

15. The non-aqueous electrolytic solution for an electric double layer capacitor according to claim 1, which has a ratio of electrical conductivity at −30° C. to electrical conductivity at 25° C. of at least 19%.

* * * * *